(12) United States Patent
Qiu et al.

(10) Patent No.: US 12,228,426 B2
(45) Date of Patent: Feb. 18, 2025

(54) METHOD AND SYSTEM OF ONE TACTILE SENSOR

(71) Applicants: Jiaoming Qiu, Maple Grove, MN (US); Kevin Haocheng Qiu, Maple Grove, MN (US)

(72) Inventors: Jiaoming Qiu, Maple Grove, MN (US); Kevin Haocheng Qiu, Maple Grove, MN (US)

( * ) Notice: Subject to any disclaimer, the term of this patent is extended or adjusted under 35 U.S.C. 154(b) by 148 days.

(21) Appl. No.: 18/305,377

(22) Filed: Apr. 24, 2023

(65) Prior Publication Data
US 2024/0353239 A1    Oct. 24, 2024

(51) Int. Cl.
*G01D 5/14*      (2006.01)
(52) U.S. Cl.
CPC .................................. *G01D 5/14* (2013.01)

(58) Field of Classification Search
CPC ...... G01D 5/142; G01D 5/145; G01D 5/2033; G01D 5/2241
See application file for complete search history.

(56) References Cited

U.S. PATENT DOCUMENTS

| | | | | |
|---|---|---|---|---|
| 8,736,281 | B2 * | 5/2014 | Lowe .................. | G01M 5/0033 |
| | | | | 73/579 |
| 9,570,676 | B2 * | 2/2017 | Kolb ...................... | G01R 33/07 |
| 2009/0295382 | A1 * | 12/2009 | Sterling ............... | G01R 33/091 |
| | | | | 324/252 |

* cited by examiner

*Primary Examiner* — Tung X Nguyen

(57) ABSTRACT

Methods, systems, and programing of one tactile sensor are presented. In one example, magnetic sensors containing one or more layers are formed on a base substrate for sensing a magnetic field generated by one ferromagnet present in close proximity to the magnetic sensors. The ferromagnet is embedded in an elastomer matrix. When an external force is applied to the elastomer matrix, it deforms and displaces the ferromagnet. As a result, the magnetic field generated by the ferromagnet changes. This change is sensed by the magnetic sensors to in turn quantify the applied force.

8 Claims, 10 Drawing Sheets

METHOD AND SYSTEM OF ONE TACTILE SENSOR

BACKGROUND

1. Technical Field

The present teaching relates to the methods, systems, and programming of tactile sensors and sensor arrays. Particularly, the present teaching is directed to the methods, systems, and programming of tactile sensors or sensor arrays with ferromagnets and magnetic sensors.

2. Discussion of Technical Background

The fast development of robotics industry demands more and better sensors that enable robotic systems to sense their environment before taking further actions. Among them, tactile sensors or devices (tactile sensor and tactile device may be used interchangeably in the following description) offer directly measured data that can allow robots to precisely detect physical properties such as stiffness, friction, weight distribution, to declare touch, and to identify types of touch. Various robotic applications may require various levels of form factor, fidelity, durability, sensitivity, and detection range. For mass production applications, cost and volume manufacturability are also crucial factors to consider.

Touch location resolution is an important feature required for certain robotics applications including object grasping and manipulation. However, most existing tactile sensor technologies have clear constraints and limitations in allowing robots to adjust their grip on an object. For example, capacitance-based tactile sensors lack the ability to collect directional information, which is critical for robots to detect slipping when it occurs. Some recent tactile sensors developed using magnetic sensors are not volume production friendly, meaning part-to-part variation is exceedingly difficult to control and requires tedious and expensive calibration.

Therefore, there is a demand for an improved method of manufacturing tactile sensors or sensor arrays using ferromagnets and magnetic sensors to avoid the aforementioned drawbacks.

SUMMARY

The present teaching relates to the methods, systems, and programming of tactile sensors or sensor arrays. Particularly, the present teaching is directed to the methods, systems, and programming of tactile sensors and sensor arrays using ferromagnets and magnetic sensors.

In one example, a method for creating a device implemented on a robot or machine with at least one processor and data storage is presented. The device may be used purely for sensing purposes or may have data processing abilities as well. Magnetic sensors with one or more layers are formed on a base substrate to sense a magnetic field generated by a ferromagnet present in close proximity to the magnetic sensors. The ferromagnet is embedded in an elastomer matrix, which deforms upon an applied external force and displaces the ferromagnet accordingly. The magnetic field generated by the ferromagnet thus changes to have different strength or distribution, which can be detected by the magnetic sensors. The sensor signal is then used to derive information about the applied external force, such as its magnitude and direction for the robot or machine to react.

In another example, a method, implemented on a robot or machine having at least one processor and data storage, for contact quantification is presented. A first level of a magnetic field is detected using a device comprising magnetic sensors. The magnetic sensors are configured to sense the magnetic field created by ferromagnet placed in close proximity to the magnetic sensors. The device comprises a ferromagnet that is embedded in an elastomer matrix. When the elastomer matrix makes physical contact with external solid surfaces, it deforms and displaces the ferromagnet embedded in it. The magnetic sensors detect the change in the magnetic field before and after contact occurs and provide information relating to the strength and direction of the force applied to the machine upon contact so that it can react properly.

In yet another example, a tactile sensor array device is presented. The device is comprised of a base, multiple sets of magnetic sensors arranged on the base, and a plurality of ferromagnets. The magnetic sensors comprise one or more layers to sense a magnetic field generated by the ferromagnet present in close proximity to the magnetic sensors. Each of the ferromagnets is embedded in an elastomer matrix. When the elastomer matrices make physical contact with external solid surfaces, they deform and displace the ferromagnets embedded in them. The magnetic sensors detect magnetic field change for each ferromagnet before and after contact occurs to provide applied force direction and strength as well as their distribution information across the tactile sensor array device.

In a different example, a system having at least one processor and storage for contact detection in a robotics machine is presented. The system includes a data processing device and multiple contact detectors. Each of the contact detectors comprises a base, a plurality of magnetic sensors arranged on the base, and a ferromagnet. The magnetic sensors are configured to sense the magnetic field generated by the ferromagnet present in close proximity to the magnetic sensors. The ferromagnet is embedded in an elastomer matrix. When the elastomer matrix makes physical contact with other solid surfaces, it deforms and displaces the ferromagnet embedded in it. The magnetic sensors detect the magnetic field change for each ferromagnet before and after contact occurs and send data to the processor to declare contact and generate applied force direction and strength as well as their distribution information across all the contact detectors.

Other concepts relate to software for touch quantification. A software product, in accordance with this concept, includes at least one non-transitory machine-readable medium and information carried by the medium. The information carried by the medium may be executable program code data regarding parameters in association with a request or operational parameters, such as information related to a user, a request, a social group, or other related.

In one example, a non-transitory machine-readable medium with information recorded thereon for creating a device is presented. The recorded information, when read by the machine, causes the machine to perform the following tasks. Magnetic sensors with one or more layers are formed on a base to sense a magnetic field generated by a ferromagnet present in close proximity to the magnetic sensors. The ferromagnet is embedded in an elastomer matrix. When the elastomer matrix makes physical contact with other solid surfaces, it deforms and displaces the ferromagnet embedded in it. The magnetic sensors detect magnetic field changes before and after contact occurs.

In another example, a non-transitory machine-readable medium with information recorded thereon for contact detection in a robotics machine is presented. The recorded information, when read by the machine, causes the machine to perform the following tasks. The machine includes a data processing device and a contact detector. The contact detector is comprised of a base, a set of magnetic sensors arranged on the base, and a ferromagnet. The magnetic sensors are configured to sense the magnetic field generated by the ferromagnet present in close proximity to the magnetic sensors. The ferromagnet is embedded in an elastomer matrix. When the elastomer matrix makes physical contact with other solid surfaces, it deforms and displaces the ferromagnet embedded in it. The magnetic sensors detect the change in magnetic field before and after contact occurs and send the data to the processing device to declare contact.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the drawings, and wherein.

DETAILED DESCRIPTION

Figure 1:
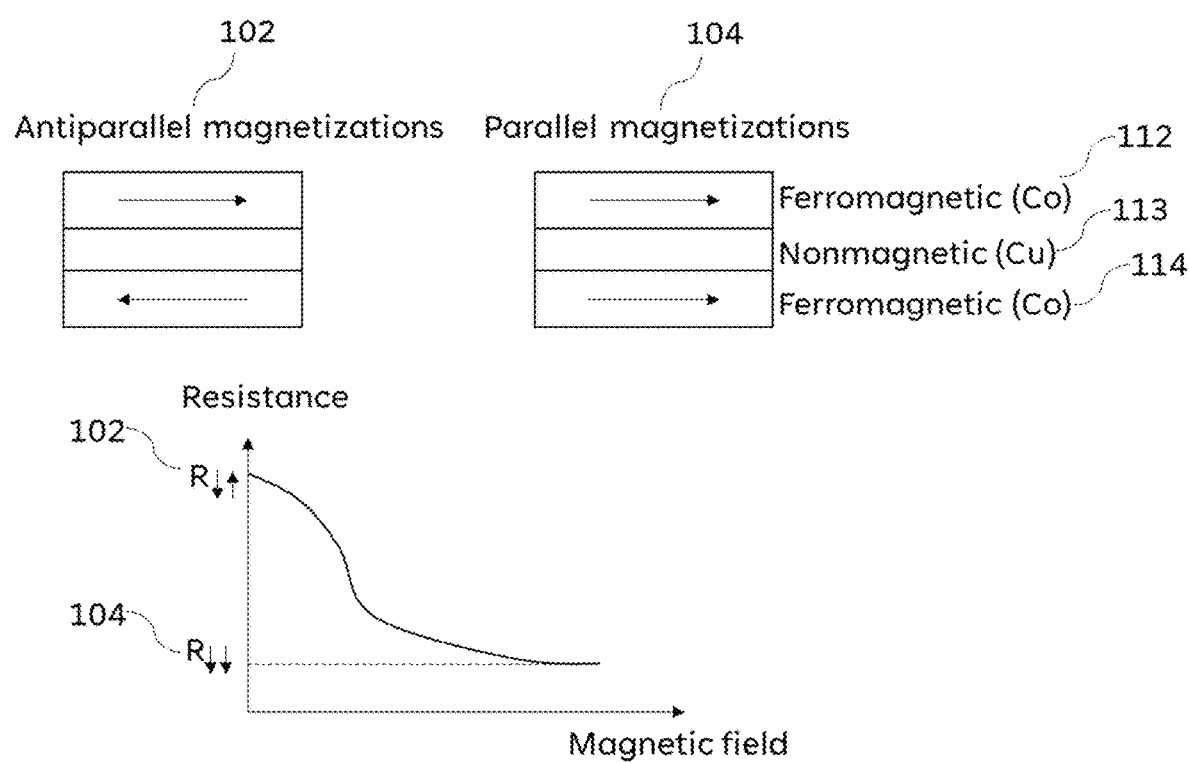
FIG. 1 (PRIOR ART) depicts an exemplary structure and characteristics of a giant magnetoresistance (GMR) sensor.

In the following description, numerous specific details are explained by way of examples in order to provide a thorough understanding of the relevant teachings. However, it should be apparent to those skilled in the art that the present teachings may be practiced without such details. In other instances, well-known methods, procedures, systems, components, and/or circuitry have been described at a high-level, without details, in order to avoid unnecessary obscuring aspects of the present teaching.

The present disclosure describes method, system, and programming aspects of an effective tactile sensor. The method and system as disclosed herein aim at improving a user's contact or touch detection experience.

A giant magnetoresistance (GMR) sensor, along with other magnetoresistance (AMR: anisotropic magnetoresistance; TGMR: tunneling giant magnetoresistance) sensors, provides an elevated level of precision in detecting magnetic field and its subtle variations. It has been used in magnetic storage devices, medical devices such as pacemakers, and in magnetic particle labelled biological or chemical process detection applications. When magnetic objects are in close proximity to these magnetic sensors, the magnetic field generated by them can be sensed by these sensors with exceedingly high precision. With a pre-configured sensor layout, the distance between the sensor and magnetic object as well as their relative position information can be derived by solving corresponding physics equations. An array of magnetic sensors can be placed on the same chip on a printed circuit board (PCB) hosting other electronic components to form a fully functional sensor device.

According to various embodiments of the present teaching, the method and system to create a tactile sensor is disclosed. A plurality of magnetic sensors is configured for sensing magnetic fields generated by ferromagnets present in close proximity to the magnetic sensors. Each of the ferromagnets is embedded in an elastomer matrix. When the elastomer matrices make physical contact with other solid surfaces, they deform and displace the ferromagnets embedded in them. The magnetic sensors detect the magnetic field change for each ferromagnet before and after contact occurs and send data to the processing device to quantify the contact. The device can provide contact direction, strength of encountered force, as well as their distribution information across the tactile sensors using predefined algorithms.

Furthermore, contact or touch detection device formation in the present teaching utilizes a typical semiconductor processing approach. There are at least two major advantages of this approach compared to others. The first advantage is manufacturability. Magnetic sensors are formed on generic substrates such as silicon or PET (polyethylene terephthalate), followed by spin-coating of two or more layers of elastomers with a ferromagnet formed in between. The height, width, and shape of the ferromagnet can be controlled as it is made in situ using either physical deposition techniques or electrochemical approaches (plating). The second advantage is the small footprint of the entire device. Unlike other methods by which magnets and elastomer matrices are typically assembled, which usually limit their sizes to the millimeter scale, the approach disclosed here can produce devices at the micrometer level or even the nanometer scale. These two advantages make it a good fit for large volume applications, such as for robotics, at a low cost.

Additional novel features will be explained in part in the description which follows, and in part will become apparent to those skilled in the art upon examination of the following and the accompanying drawings. The novel features of the present teaching may be realized and attained by practice or use of various aspects of the methodologies, instrumentalities and combinations explained in the detailed examples discussed below.

FIG. 1 (PRIOR ART) depicts an exemplary structure and characteristic of a GMR sensor. A GMR sensor is one type of magnetic field sensors that utilize a giant magnetoresistance effect: when there are two magnetic layers separated by one thin nonmagnetic layer, their relative magnetization directions (parallel or antiparallel) result in different resistance states. As shown in FIG. 1, a GMR sensor includes three layers: two ferromagnetic layers 112, 114 comprised of cobalt (Co) separated by one nonmagnetic layer 113 comprised of copper (Cu). A resistance corresponding to parallel magnetization 104 is smaller than a resistance corresponding to antiparallel magnetization 102.

To utilize the GMR effect, a spin valve structure is usually built by fixing one layer's magnetization and letting the other one rotate freely. The fixed layer is called the reference layer and the rotatable layer is called the freelayer. The reference layer may be confined by an antiferromagnetic layer (comprising PtMn or IrMn) directly or indirectly through a so-called SAF (synthetic antiferromagnetic) structure. When the spin valve GMR sensor senses a magnetic field, the freelayer will rotate so that GMR resistance is changed. Typically, a static biasing current is applied through the GMR structure, so a voltage change is measured instead of the resistance.

Preparation of current perpendicular to plane (CPP) GMR sensors may comprise bottom contact deposition, GMR multilayer stack deposition, top contact deposition, and sensor structure patterning involving photolithography, iron milling and insulator backfill, etc. Preparation of current in plane (CIP) GMR sensors may comprise GMR multilayer stack deposition, top contact deposition, and sensor structure patterning involving photolithography, iron milling and insulator back fill, etc.

Figure 2:
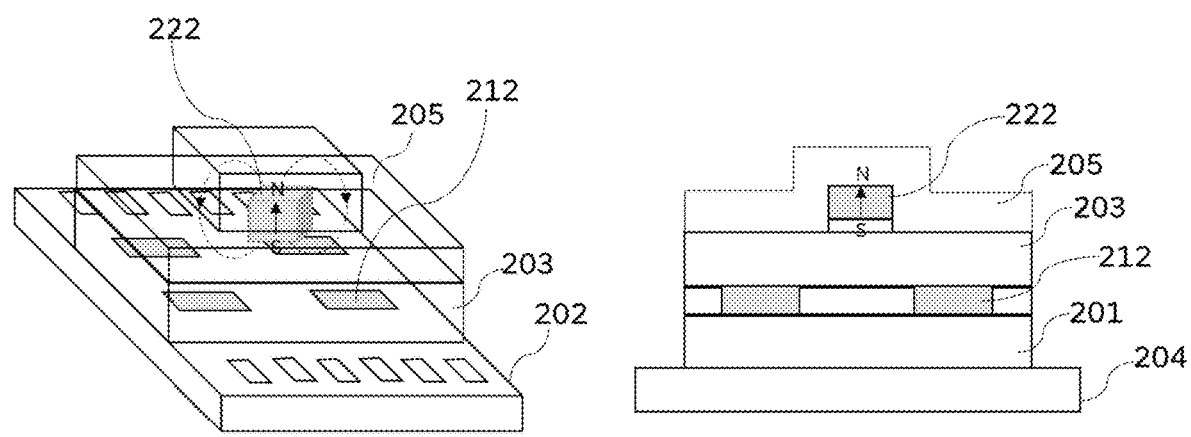
FIG. 2 illustrates an exemplary configuration of the tactile sensor setup, according to an embodiment of the present teaching.

FIG. 2 illustrates an exemplary configuration of the tactile sensor setup according to an embodiment of the present teaching. As shown in FIG. 2, at 202, a set of magnetic sensors 212 are formed on the base 201 (only viewable at the cross-section view 204). There are four magnetic sensors shown in this illustration, but it should be apparent to those skilled in the art that the quantity can be two, three or more depending on the detection algorithm. The sensors are covered by a basecoat elastomer layer 203. Ferromagnet 222 sits on top of 203 and is covered by an overcoat elastomer layer 205. Here 205 is conformally covering so it follows the ferromagnet's topography. 204 is the cross-section view of 202 for clarity.

Therefore, in 202, there has been a ferromagnet 222 embedded in an elastomer matrix comprised of layers 203 and 205. The magnetic sensor set 212 can detect the magnetic field generated by ferromagnet 222, which is in proximity to the magnetic sensors. At 202, the resistance or voltage signal at magnetic sensor set 212 is determined by the distances between ferromagnet 222 and the magnetic sensors, as well as the magnetic moment of the ferromagnet 222 itself.

The spacing between ferromagnet 222 and magnetic sensors is determined by the thickness of elastomer layer 203, and the thickness of the seedlayer used to either sputter, evaporate, or plate the ferromagnet, and the lateral spacing between the magnetic sensors, as well as the size of the ferromagnet 222 itself. With the exception of the thickness of elastomer layer 203, the other spacing elements are fixed so they can be considered constant during the touch or contact process and should have negligible impact to sensor signal change.

Figure 3:
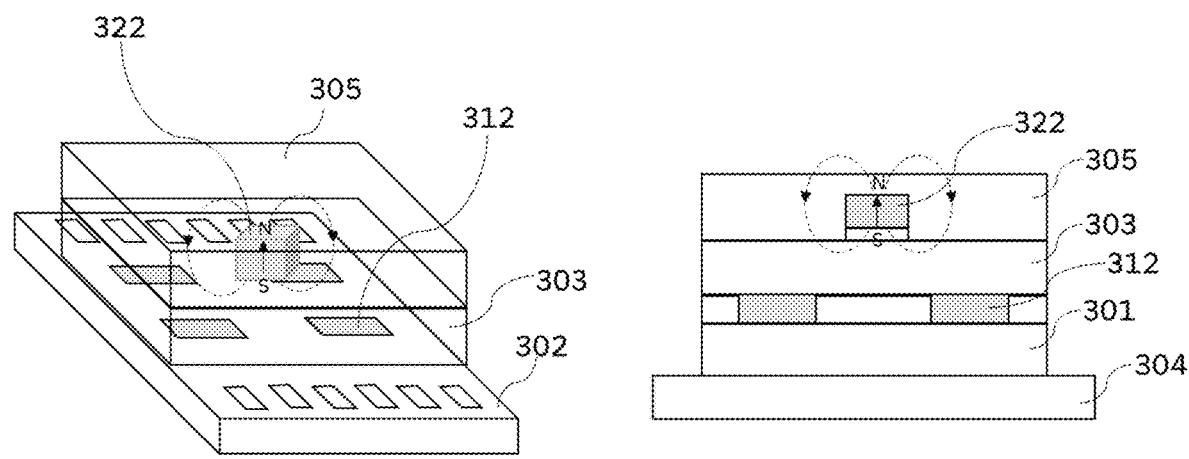
FIG. 3 illustrates another exemplary configuration of the tactile sensor setup, according to another embodiment of the present teaching.

FIG. 3 illustrates another exemplary configuration of the tactile sensor setup, with magnetic sensor set 312, elastomer basecoat layer 303, elastomer overcoat layer 305 and ferromagnet 322 according to an embodiment of the present teaching. The main difference between the configurations in FIG. 2 and FIG. 3 is that the elastomer overcoat layer 305 has a flat top instead of following the topography created by the ferromagnet formation. This difference affects the device's sensitivity to compressive force and shear force, as explained in the following description.

Figure 4:
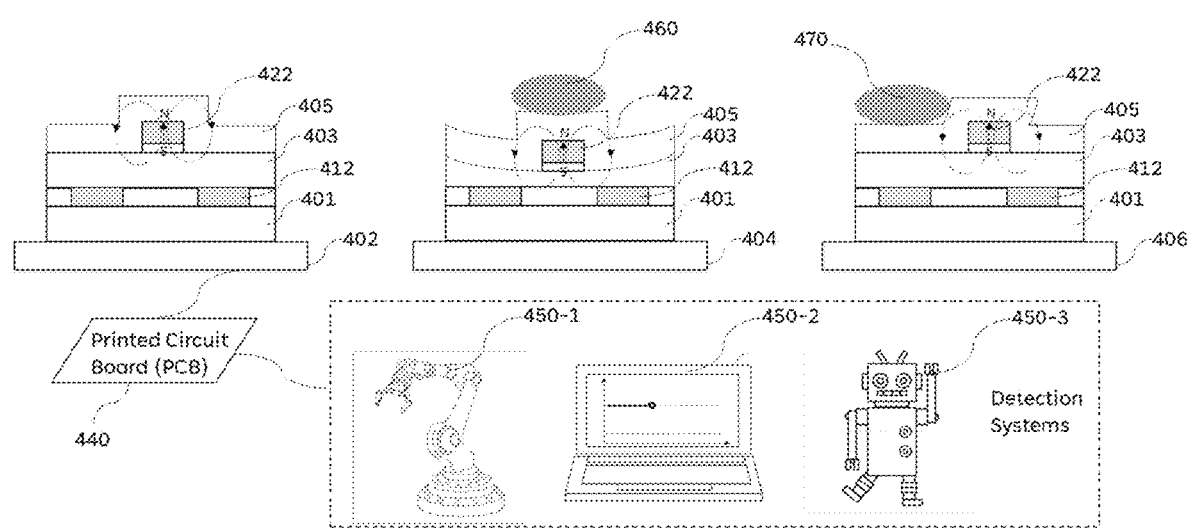
FIG. 4 illustrates an exemplary process of how compressive and shear forces may be detected using the tactile sensor setup as described by FIG. 2.

FIG. 4 explains the working principle of the tactile sensor device described by FIG. 2. When the device is freestanding as shown in 402, the magnetic sensors detect the magnetic field generated by ferromagnet 422 and record it as the initial state. The initial state data can be stored by a non-transitory machine-readable medium through the printed circuit board 440, which connects with or resides in a system such as a robotic arm 450-1, a computer such as 450-2, or a robot 450-3.

In the case of a compressive force being applied to the tactile device, as shown by 404, one object 460 touches the elastomer overcoat layer 405 from above, deforming both 405 itself as well as the elastomer basecoat layer 403. Magnetic sensors sit within a rigid layer (typically made of alumina), so their positions are not affected by the compressive force. The deformation of 405 and 403 causes the ferromagnet 422 to move vertically downwards, bringing it closer to the magnetic sensors. The magnetic field sensed by the magnetic sensors 412 is then increased, causing them to report a stronger signal to the PCB 440 and the detection systems 450.

In the case of a shear force being applied to the tactile device, as shown by 406, another object 470 is touching the elastomer overcoat layer 405 from the left side, deforming 405 towards the right. The deformation of 405 causes the ferromagnet 422 to move laterally towards the right side, bringing it closer to some of the magnetic sensors while moving it away from the others. The magnetic field sensed by magnetic sensors 412 increases if their distance from the ferromagnet decreases and decreases if their spacing to the ferromagnet is increased. Therefore, the magnetic sensors 412 report different signal changes to the PCB 440 and the detection systems 450.

FIG. 4 illustrates two simplified cases of applying compressive force and shear force, independently. It should be apparent to those skilled in the art that in many cases both compressive force and shear force co-exist or are applied with different ratios to the elastomer layers. The deformation of the elastomer layers and the displacement of the ferromagnet will be a combined result. That is one of the reasons why more than one magnetic sensor is needed to detect the magnetic field changes caused by the ferromagnet displacement, so compressive and shear components of the applied force can both be quantified.

In FIG. 4 the conformal formation of the elastomer overcoat layer 405 creates a protruded top right above the ferromagnet 422. This helps to increase device sensitivity to shear force as illustrated in 406, though may add noise when pure compressive force is applied if the overcoat layer 405 around the ferromagnet 422 is not uniformly deformed in 404. The impact may be calibrated and saved in the non-transitory machine-readable medium.

Figure 5:
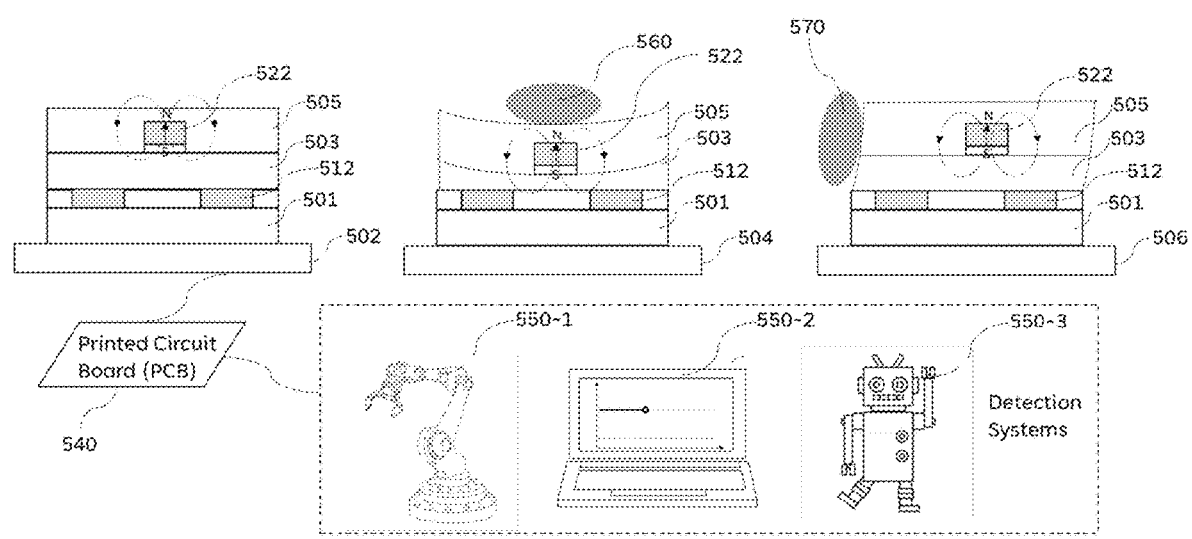
FIG. 5 illustrates another exemplary process of how compressive and shear forces may be detected using the tactile sensor setup as described by FIG. 3.

FIG. 5 explains the working principle of the tactile sensor device described by FIG. 3. When the device is freestanding as illustrated in 502, the magnetic sensors detect the magnetic field generated by ferromagnet 522 and record it as the initial state. The initial state data can be stored by a non-transitory machine-readable medium through the printed circuit board 540, which connects with or resides in a system such as a robotic arm 550-1, or a computer 550-2, or a robot 550-3.

In the case of a compressive force being applied to the tactile device, as shown by 504, one object 560 touches the elastomer overcoat layer 505 from above, deforming both 505 itself as well as the elastomer basecoat layer 503. Magnetic sensors sit within a rigid layer (typically made of alumina), so their positions are not affected by the compressive force. The deformation of 505 and 503 causes the ferromagnet 522 to move vertically downwards so it gets closer to the magnetic sensors. The magnetic field sensed by the magnetic sensors 512 is then increased, so they report a stronger signal to the PCB 540 and the detection systems 550.

In the case of a shear force being applied to the tactile device, as shown by 506, another object 570 is touching the elastomer overcoat layer 505 and/or basecoat layer 503 from the left side, deforming 505 and 503 towards the right. The deformation of 505 and 503 mostly causes the ferromagnet 522 to move laterally towards the right side, bringing it closer to some of the magnetic sensors while moving it away from the others. The magnetic field sensed by magnetic sensors 512 increases if their distance from ferromagnet 522 decreases and decreases if their spacing to the ferromagnet is increased. Therefore, the magnetic sensors 512 report different signal changes to the PCB 540 and the detection systems 550.

FIG. 5 illustrates two simplified cases of applying compressive force and shear force independently. It should be apparent to those skilled in the art that in many cases both compressive force and shear force co-exist or are applied with different ratios to the elastomer layers. The deformation of the elastomer layers and the displacement of the ferromagnet will be a combined result of these two forces.

In FIG. 5 the flat top of the elastomer overcoat layer 505 helps to improve the detection sensitivity and accuracy of detecting a compressive force as illustrated in 504. However, without the protruded portion as shown in FIG. 4 by 406, the tactile sensor device is less sensitive to shear force as illustrated in 506. The impact may be calibrated and saved in the non-transitory machine-readable medium.

Figure 6:
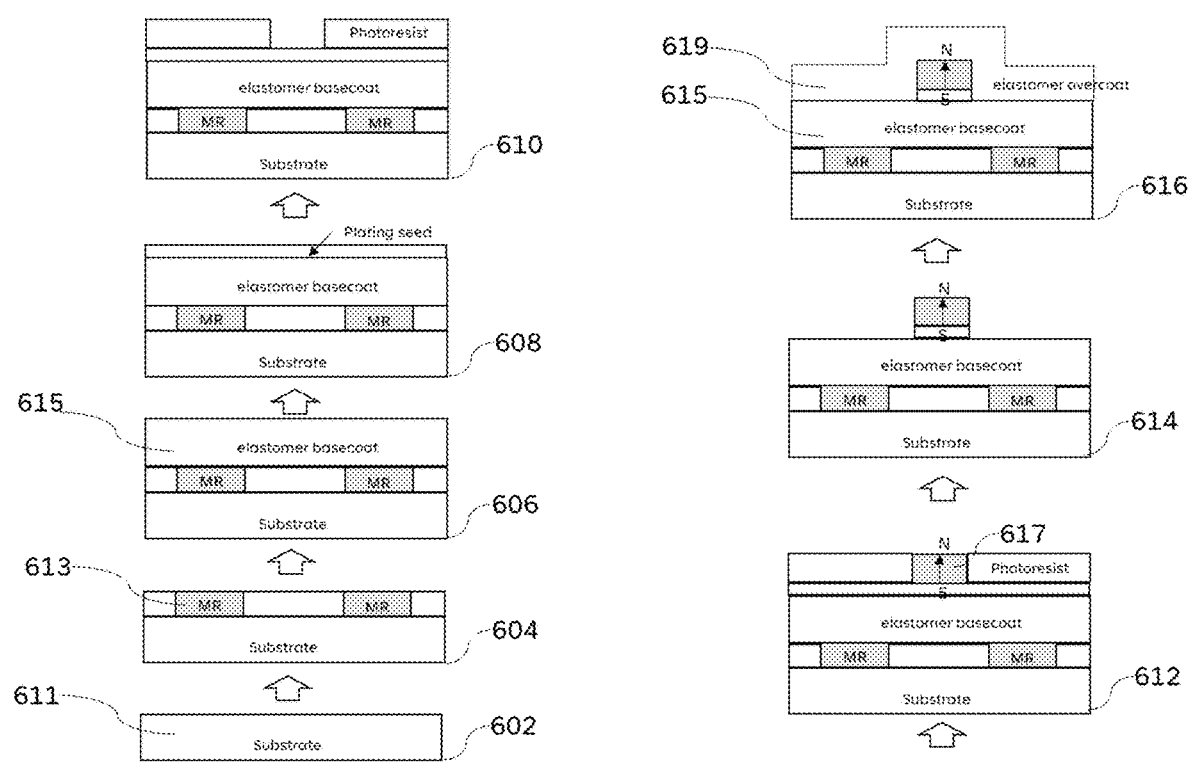
FIG. 6 is a flow chart of an exemplary process for creating the tactile sensor setup as described by FIG. 2.

FIG. 6 illustrates an exemplary process flow of forming the tactile sensor as illustrated by FIG. 2, according to an embodiment of the present teaching. At 602, the base substrate 611 used to fabricate the tactile sensor can be made of rigid materials such as silicon, GaAs, AlTiC, or flexible substrates such as polyimide, polyethylene terephthalate (PET), polyethylene-2,6-naphthalate (PEN), polydimethyl siloxane (PDMS), etc.

At 604, on base substrate 611, a plurality of contact pads and magnetic sensors 613 are obtained to make a chip. In accordance with various embodiments, magnetic sensors 613 may be comprised of GMR sensors, AMR (anisotropic magnetoresistance) sensors, TGMR (tunneling giant magnetoresistance) sensors, Hall sensors, etc. The magnetic sensors are inside the chip and the plurality of contact pads are around the chip edges. In accordance with one embodiment, the chip is protected from the following process steps by coating it with a thin dielectric material such as alumina or other nonmagnetic protection layers.

At 606, the chip with magnetic sensors is coated with an elastomer basecoat layer 615. In accordance with various embodiments, elastomer basecoat material 615 may be comprised of natural rubbers, styrene-butadiene block copolymers, polyisoprene, polybutadiene, ethylene propylene rubber, ethylene propylene diene rubber, silicone elastomers, fluoroelastomers, polyurethane elastomers, and nitrile rubbers, etc.

At 608, a thin layer of seed material is placed on the elastomer basecoat if electrochemical deposition is used to obtain the ferromagnet later. This seed layer provides a current conduction path during the electrochemical deposition process and may be removed from areas other than those under the ferromagnet.

At 610, standard photolithography process is used to prepare for the electrochemical deposition of the ferromagnet. Holes in the size range of tens of nanometers to sub-millimeters are formed by patterning the photoresist layer with masks. The depth of the holes is in the range of hundreds of nanometers to tens of micrometers.

At 612, ferromagnet 617 is obtained through electrochemical deposition or plating. It can be made of various different materials, such as soft magnetic materials including iron, cobalt, nickel, and their alloys or permanent magnetic materials such as NbFeB, SmCo5, FePt, CoPt, etc. The top-down view shape of the ferromagnet can be circular, rectangular, square, or other shapes.

At 614, photoresist is removed to prepare for the next step. In case the photoresist material is used as the elastomer, it may stay as is or be trimmed to control its final thickness.

At 616, an elastomer overcoat layer 619 is placed on top of the ferromagnet. This elastomer layer 619 may use the same material as the elastomer basecoat layer 615 or may be different from it. The coating process is chosen to be conformal so that the area directly above the ferromagnet is protruded over the other areas.

Figure 7:
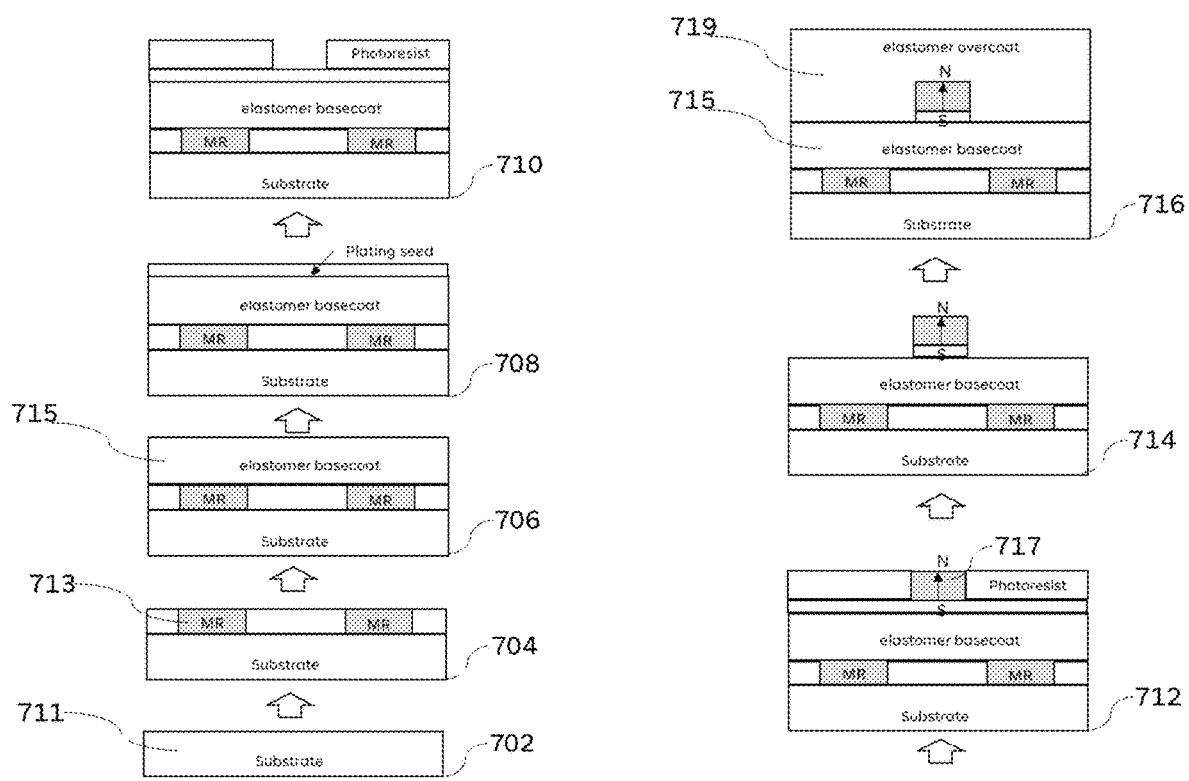
FIG. 7 is a flow chart of another exemplary process for creating the tactile sensor setup as described by FIG. 3.

FIG. 7 illustrates another exemplary way of constructing the tactile device as illustrated by FIG. 3, according to an embodiment of the present teaching. A major difference from FIG. 6 is that the step of coating the elastomer overcoat may involve a planarization step to keep the finished top flat.

It should be apparent to those skilled in the art that the materials used in FIG. 7 may be the same or different from those in FIG. 6. For example, the elastomer basecoat layer 715 and overcoat layer 719 may be different from the cases of 615 and 619 in FIG. 6 in order to optimize or modify device performance.

Figure 8:
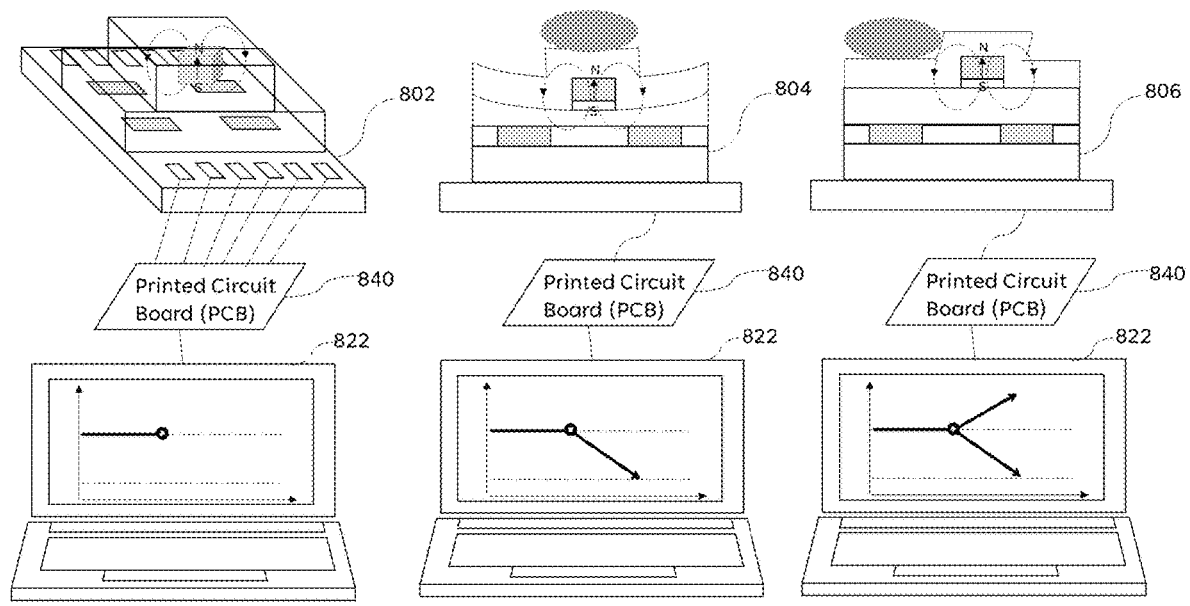
FIG. 8 illustrates an exemplary signal detection process using the tactile sensor setup as described by FIG. 2.

FIG. 8 illustrates an exemplary process of tactile sensor data collection and processing, according to an embodiment of the present teaching. The tactile sensor illustrated in FIG. 2 is used. A similar process can be used with the tactile sensor illustrated in FIG. 3.

At 802, the magnetic sensors detect the magnetic field generated by the ferromagnet and save the initial state signal to a non-transitory machine-readable medium before contact or touch occurs. The data is transmitted to a computer 822 through a PCB 840 and displayed on a screen.

At 804, when an object is touching the tactile device from the top, applying a compressive force to the elastomers, the magnetic sensors detect a stronger magnetic field, as the ferromagnet is displaced towards the sensors. Computer 822 processes the data together with other information (like ambient temperature) and translates magnetic field strength change into elastomer deformation. On the computer screen, the resistance values decrease, as GMR sensors have more parallel magnetizations at high field.

At 806, when an object is touching the tactile sensor from the left side, a shear force is applied to the elastomers, so magnetic sensors on the left side detect a reduced magnetic field while magnetic sensors on the right side detect an increased magnetic field due to the ferromagnet being displaced towards the right side. Computer 822 processes the data together with other information (like ambient temperature) and translates magnetic field strength change into elastomer deformation. On the computer screen, the resistance values are reduced for magnetic sensors on the right side and increased for magnetic sensors on the left side, as their magnetizations are more antiparallel for a reduced magnetic field.

Figure 9:
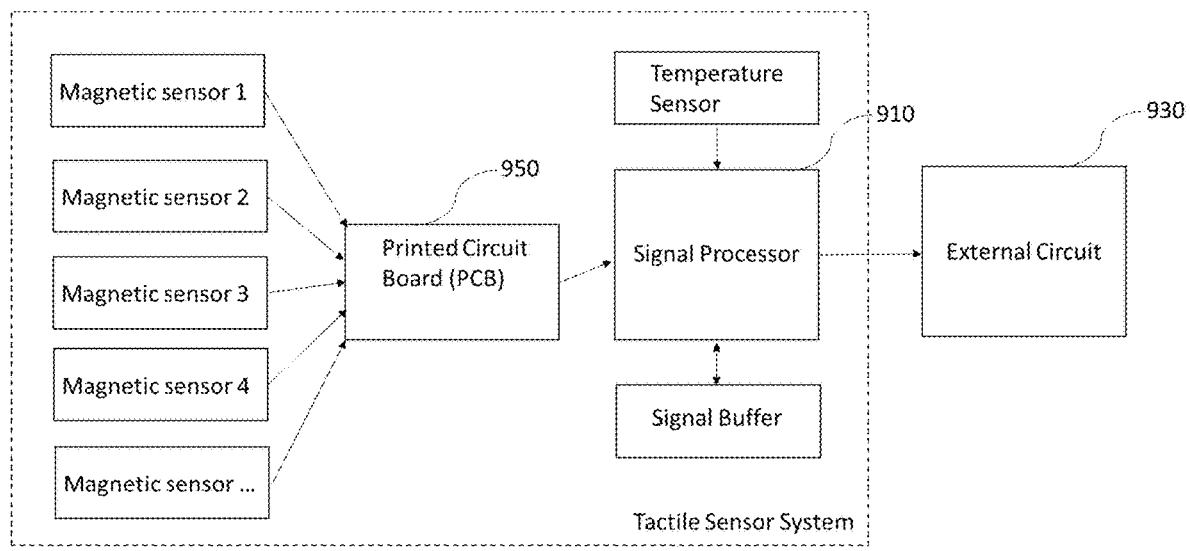
FIG. 9 is a diagram of an exemplary system configuration of performing signal collection, processing, and storage.

FIG. 9 illustrates a diagram of an exemplary system configuration of performing signal collection, processing, and storage, according to an embodiment of the present teaching. The tactile sensor device may have multiple magnetic sensors that are connected to a printed circuit board (PCB) 950 via the contact pads on the chip. The PCB transmits the magnetic sensor signal to a processor 910, which also receives temperature information from a temperature sensor. There is a signal buffer that stores magnetic sensor signal versus time. The processed signals may be in the form of the ferromagnet's displacement vector (both magnitude and direction) and are transmitted to an external circuit 930.

Figure 10:
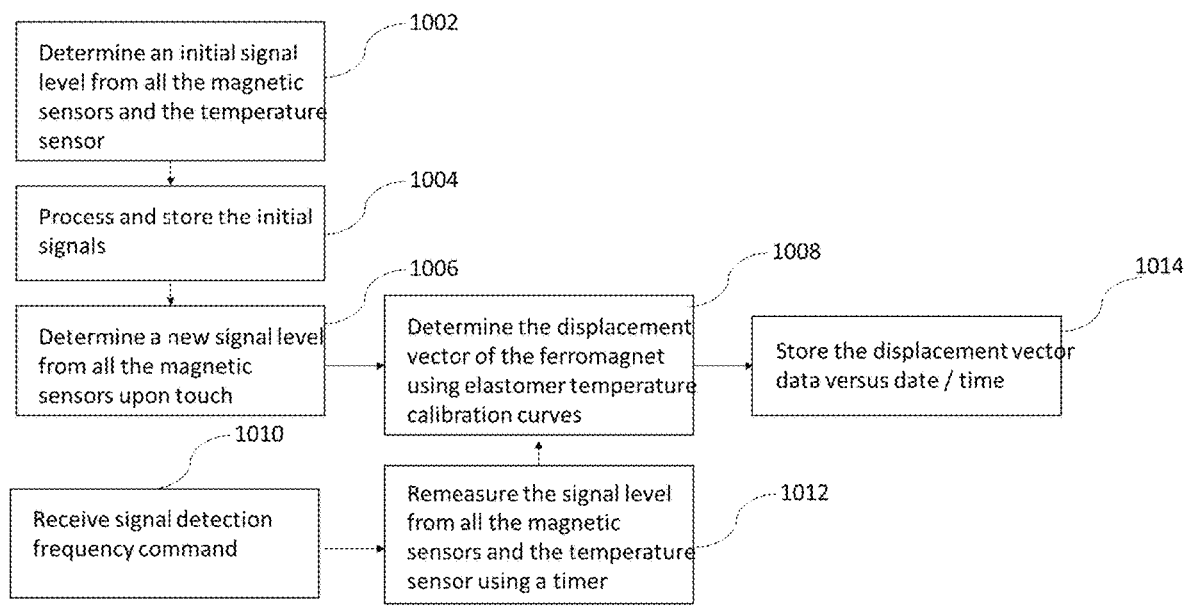
FIG. 10 is a flowchart of an exemplary process of performing signal collection, processing, storage using the tactile sensor system.

FIG. 10 is a flowchart of an exemplary process of performing signal collection, processing, data storage using the tactile sensor system. At 1002, before contact or touch occurs, both the magnetic sensors and the temperature sensor collect their own initial state data and send it to the processor and a non-transitory machine-readable medium to process and store at 1004. Upon contact or touch, magnetic sensors collect new signal levels at 1006 and send them to the processor to determine the displacement vector of the ferromagnet using elastomer temperature calibration curves at 1008. Depending on the requirement of practical application, the system may receive a signal collection frequency request at 1010 and perform a remeasure of the signal levels from all the magnetic sensors as well as the temperature sensor at 1012 accordingly. The remeasured data is sent to 1008 and gets processed into the displacement vector of the ferromagnet as a function of time. The displacement versus time data is then transmitted to and stored at 1014.

The above exemplary descriptions focus on one set of magnetic sensors to detect signals from one ferromagnet embedded in an elastomer matrix for contact or touch quantification. It should be apparent to those skilled in the art that the setup may be extended to arrays of tactile sensor devices on the same or different printed circuit boards (PCB's) to have multi-point contact or touch detection. The number of magnetic sensors and their layout on the substrates can be the same or different for each tactile device unit. Similarly, the materials used for the substrates, elastomer matrixes and the ferromagnets can be the same or different for each tactile device unit.

To implement the present teaching, computers or robotics may be used as the hardware platform(s) for one or more of the elements described herein. The hardware elements, operating systems, and programming languages of such computers are conventional in nature, and it is presumed that those skilled in the art are adequately familiar with them to adapt those technologies to implement the processes described here. A computer with user interface elements may be used to implement a personal computer (PC) or other types of workstations or terminal devices, although a computer may also function as a server if appropriately programmed. It is believed that those skilled in the art are familiar with the structure, programming, and general operation of such computer equipment and as a result the drawings should be self-explanatory.

All or portions of the software may at times be communicated through a network such as the Internet or various other telecommunication networks. Such communications, for example, may enable loading of the software from one computer or processor into another. Thus, other types of media that may bear the software elements include optical, electrical, and electromagnetic waves, such as used across physical interfaces between local devices, through wired and optical landline networks and over various air links. The physical elements that carry such waves, such as wired or wireless links, optical links, or the like, may also be considered as media bearing the software. As used herein, unless restricted to tangible "storage" media, terms such as computer or machine "readable medium" refer to any medium that participates in providing instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method for detecting contact or touch, comprising:
   the detection of a first level of magnetic field via a device comprising a substrate with a plurality of magnetic sensors configured for sensing a magnetic field generated by a ferromagnet in proximity to the magnetic sensors;
   the coating of the magnetic sensors with an elastomer matrix with the ferromagnet embedded in it;
   the displacement of the ferromagnet due to the deformation of the elastomer matrix upon contact or touch with an external object;
   the detection of a second level of magnetic field via the device;
   and the calculation of the displacement of the ferromagnet using a predefined algorithm.

2. The method of claim 1, wherein the elastomer matrix has a basecoat part underneath the ferromagnet, and an overcoat part above the ferromagnet, while the basecoat and overcoat can be made of the same or different materials.

3. The method of claim 1, wherein the ferromagnet is formed using photolithography-deposition process, which comprises:
   coating the elastomer basecoat with a seed layer;
   coating the seed layer by photoresist and applying standard photolithography approach to form holes with desired shape and depth;
   depositing ferromagnetic material into the holes;
   and lifting off the photoresist to prepare for coating of the elastomer overcoat.

4. The magnetic sensors according to claim 1, wherein the plurality of sensors comprises giant magnetoresistance (GMR) sensors, anisotropic magnetoresistance (AMR) sensors, tunneling giant magnetoresistance (TGMR) sensors, and Hall sensors, or a combination of them.

5. The substrate according to claim 1, wherein the substrate comprises rigid materials such as silicon, GaAs, AlTiC, or flexible materials such as polyimide, polyethylene terephthalate (PET), polyethylene-2,6-naphthalate (PEN), polydimethyl siloxane (PDMS), etc.

6. The elastomer matrix according to claim 1, wherein the elastomer matrix comprises natural rubbers, styrene-butadiene block copolymers, polyisoprene, polybutadiene, ethylene propylene rubber, ethylene propylene diene rubber, silicone elastomers, fluoroelastomers, polyurethane elastomers, and nitrile rubbers, etc.

7. The ferromagnet according to claim 1, wherein the ferromagnet comprises soft magnetic materials such as iron, cobalt, nickel, and their alloys, or permanent magnetic materials such as NbPeB, SmCo alloys, PePt, CoPt, etc.

8. The ferromagnet according to claim 1, wherein the ferromagnet comprises shapes of circular, rectangular, square, etc., if viewed from the top.

* * * * *